April 19, 1966   M. L. STARK ETAL   3,246,643
HEATING AND VENTILATING SYSTEM
Filed March 31, 1964   2 Sheets-Sheet 1
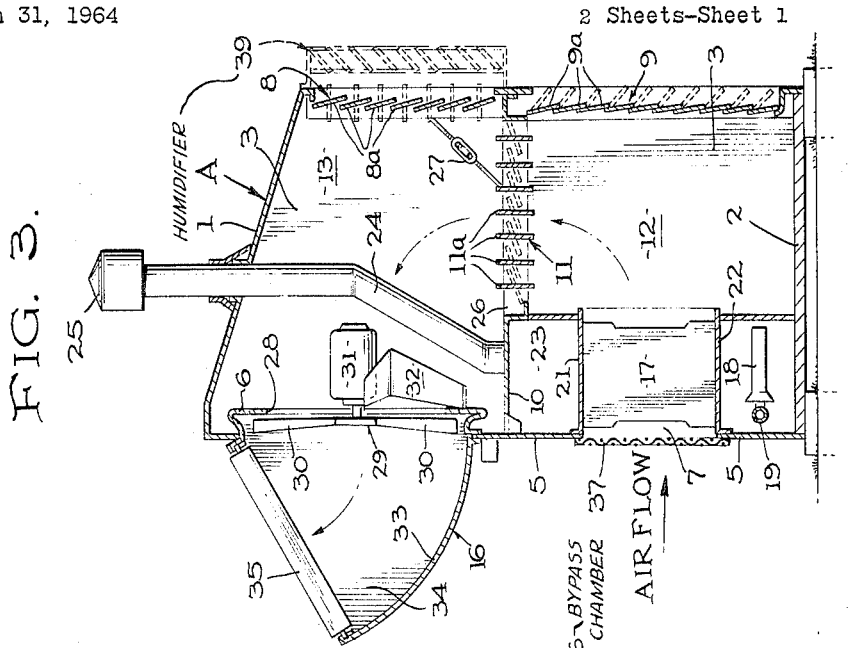
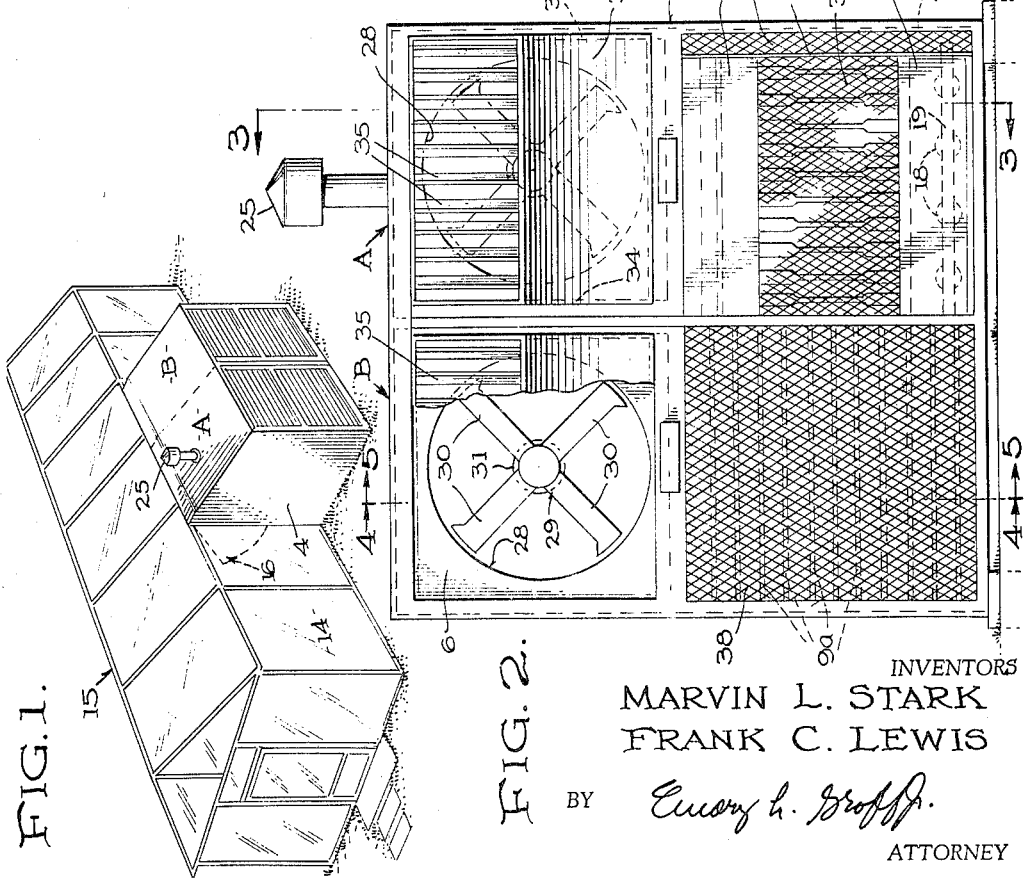
INVENTORS
MARVIN L. STARK
FRANK C. LEWIS
BY *Emory L. Groff*
ATTORNEY April 19, 1966   M. L. STARK ETAL   3,246,643
HEATING AND VENTILATING SYSTEM
Filed March 31, 1964   2 Sheets-Sheet 2
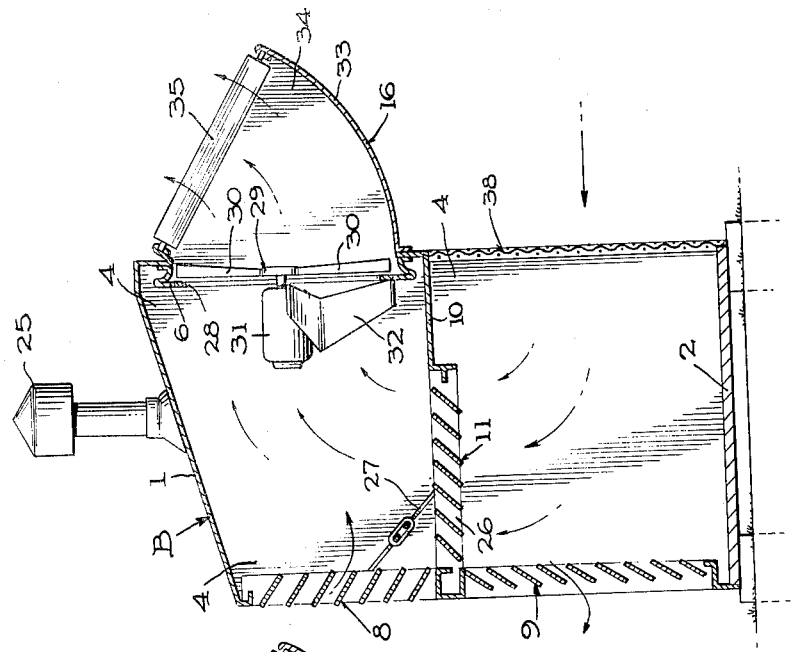
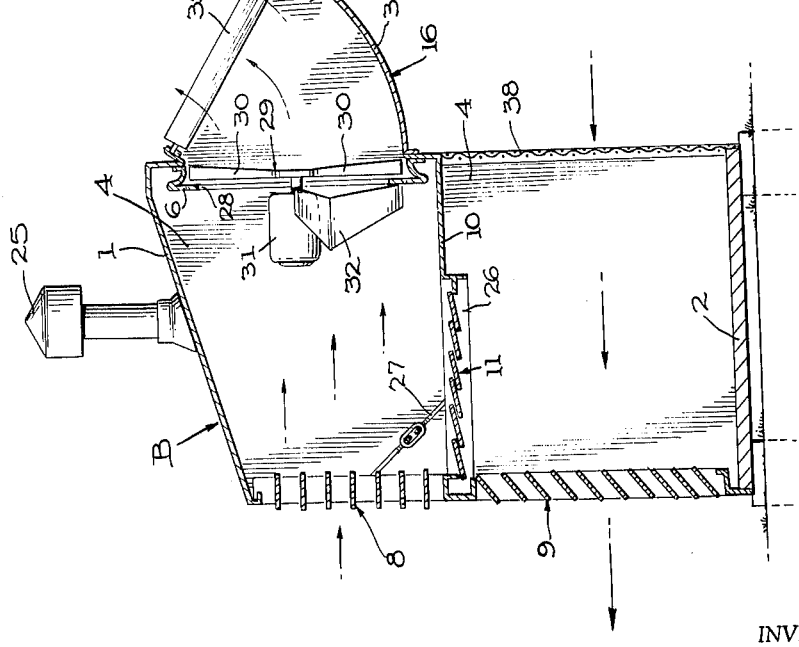
INVENTORS
MARVIN L. STARK
FRANK C. LEWIS
BY *Emory G. Groff Jr.*
ATTORNEY

United States Patent Office 3,246,643
Patented Apr. 19, 1966

3,246,643
HEATING AND VENTILATING SYSTEM
Marvin L. Stark, Anchorage, and Frank C. Lewis, Louisville, Ky., assignors to Peerless Manufacturing Division, Dover Corporation, Louisville, Ky., a corporation of Kentucky
Filed Mar. 31, 1964, Ser. No. 356,160
4 Claims. (Cl. 126—110)

This invention relates generally to environmental conditioning apparatus and more particularly to a device for providing heating and ventilating control of the air within a greenhouse or similar enclosure.

Greenhouses are usually constructed of a material which permits the reception of the maximum amount of the radiant energy emitted by the sun. In this respect, translucent or transparent sheets of glass or plastic are most often used as the covering material forming the major building component in the fabrication of a greenhouse.

Although little can be done to regulate the amount of the sun's rays available from month to month to the greenhouse user in order to achieve the maximum benefit for the propagation of the contents within the enclosure, many attempts have been made in the past to regulate the temperature and humidity within the greenhouse in order to achieve the maximum growing benefit therefrom. A continual climate control is offered by the present invention by which is achieved a 24-hour regulation of the air condition throughout every day of the year. Not only will the present unit be of assistance in the raising and cultivating of crops and flowers, but it will also find use in connection with the raising of poultry and various species of livestock. The device also offers particular merit in the post-harvest curing and conditioning of such farm items as potatoes, beans, tobacco, etc. The unit is readily adaptable to existing greenhouses or enclosures as it is entirely self-contained and is installed outside the greenhouse proper and includes means for selectively directing the conditioned air into the enclosure. By its novel arrangement the present invention may be readily adapted for the treatment of the air within greenhouses of any size.

Accordingly, one of the primary objects of the present invention is to provide a greenhouse air conditioner adapted to provide continual climatic control within the enclosure 24 hours a day.

A further object of the present invention is to provide a heating and ventilating system particularly adapted for controlling the temperature in a greenhouse in automatic response to variations and conditions therewithin.

Another object of the present invention is to provide a greenhouse air conditioner including heater means and automatically controlled dampers for regulating the proportional flow of the heated and fresh air admitted to the enclosure.

An additional object of the present invention is to provide a greenhouse air conditioner including means for automatically controlling the relative amounts of outside air taken in and mixed with air being recirculated from the greenhouse responsive to the temperature within the greenhouse.

Still another object of the present invention is to provide a greenhouse air conditioner including automatic means for regulating the static pressure within the enclosure at a preselected level.

With these and other objects in view which will more readily appear as the nature of the invention is better understood, the invention consists in the novel construction, combination and arrangement of parts hereinafter more fully described, illustrated and claimed.

A preferred and practical embodiment of the invention is shown in the accompanying drawings, in which:

FIGURE 1 is a perspective view of the present invention as adapted for the regulation of the air within a greenhouse;

FIGURE 2 is a front elevation of the invention with parts thereof broken away for clarity;

FIGURE 3 is a vertical side sectional view, partly in elevation, taken along the line 3—3 of FIGURE 2;

FIGURES 4 and 5 are vertical sectional views taken along the lines 4—4 and 5—5, respectively, of FIGURE 2 and illustrating alternate positions of the adjustable dampers whereby different air-flow patterns are achieved.

Similar reference characters are used throughout the several figures of the drawings to designate corresponding parts therein.

Referring now to the drawings, particularly FIGURES 1 and 2, it will be understood that the basic invention resides in the structure contained within the primary unit, generally designated A, which unit is shown in these figures in cooperation with a secondary or alternate unit B, the purpose of which will be described hereinafter.

The primary unit A includes a housing or casing comprising a roof 1, floor 2 and side walls 3 and 4, respectively. A front wall 5 is provided with a fan duct 6 in the upper portion thereof and a furnace duct 7 in the lower section thereof. The rear face of the housing is enclosed along its upper portion with an outside air damper generally designated 8 while immediately thereafter and enclosing the lower portion of the rear wall of the housing is an air exhaust damper, generally designated 9. A horizontally disposed partition 10 together with a similarly disposed recirculating damper 11 separates the interior of the housing A into a lower heating compartment 12 and an upper fan compartment 13, as will be most clearly seen from FIGURE 3.

As shown in FIGURE 1, the invention is adapted to be installed by mounting the front wall 5 of the unit A in abutment with one side of vertical wall 14 of the greenhouse generally designated 15. The unit should preferably be installed in the medial portion of the side 14 of the enclosure to more readily achieve a balanced air condition within the interior thereof. The side wall 14 of the greenhouse is removed in the areas immediately opposite the furnace duct 7 and fan duct 6 to provide uninhibited flow of air through these elements. The opening juxtaposed the fan duct 6 is enlarged so as to suitably receive a scoop-like upsweep discharge nozzle 16 surrounding the outer perimeter of the fan duct 6.

Suitable heat exchanger means are disposed within the furnace duct 7, such as the gas-fired heat exchangers 17 illustrated in FIGURES 2 and 3. A plurality of gas burners 18 are disposed therebeneath and connected to a common gas manifold 19 which in turn is supplied by a gas inlet pipe 20. The furnace duct 7 is arranged so that the unheated air may be drawn between the spaced apart heat exchangers 17 and directed rearwardly therefrom into the lower heating compartment 12. Thus it will follow that the top and bottom walls 21 and 22, respectively, of the furnace duct are sealed with respect to the interior of the heating duct, but are open with respect to the interior of each of the heat exchangers 17 so that the hot combustion gases may enter from the burners 18, pass upwardly through the heat exchangers 17 and exit into the exhaust chamber 23 disposed above the duct 7. The products of combustion are exhausted from the chamber 23 through an opening in the partition 10, which opening is connected with a hollow flue pipe 24 directed upwardly and through the roof 1. The uppermost extremity of the flue pipe 24 is provided with a suitable vent cap 25.

The rear wall of the lower heating compartment 12 consists of an air exhaust damper 9 comprising a plurality of adjustable damper blades 9a, which blades are interconnected to one another by suitable gang-type linkage well known in the art so as to provide for concurrent equal movement of all of the blades at any one time as will be seen from FIGURE 3 which illustrates in full and broken lines the alternate positions of all the damper blades. The rear of the compartment 12 is completely sealed off when the blades 9a are adjusted to a substantially vertical position, whereupon the blades are in overlying contact with one another, while on the other hand the lower heating compartment 12 will be open to the outside atmosphere when the blades assume the dotted line position shown in FIGURE 3.

The passageway 26 forming the sole communication between the lower heating compartment 12 and the upper fan compartment 13, is provided with a recirculating damper assembly, generally designated 11, and comprising a plurality of pivotal damper blades 11a, which are also connected to one another by suitable linkage means (not shown) to provide for simultaneous gang-type operation thereof. It will be seen from a review of FIGURE 3 that when the blades 11a are in the full-line vertical position that the most unrestricted condition is presented for permitting of the circulation of air from the lower heating compartment 12 into the upper fan compartment 13, whereby when the same blades 11a assume the horizontal position the compartment 12 will be completely sealed off with respect to the upper fan compartment 13.

The wall of the housing forming the rear of the upper compartment 13 is provided with an outside air damper assembly generally designated 8 and comprising a plurality of damper blades 8a constructed similarly to the damper blades 11a of the recirculating damper 11. The gang-type actuating means (not shown) of the outside air damper 8 are connected to the corresponding actuating linkage of the recirculating damper 11 by means of an adjustable tie-rod 27. Suitable motorized power means (not shown) are provided for regulating the movement of the tie-rod 27 and therefore the relative adjustment of the damper blades 8a and 11a. As will be seen in FIGURE 3, when the blades 8a of the outside air damper are in their fully closed position, the respective blades 11a of the ricirculating damper 11 are in the fully opened position for purposes which will become clear hereinafter.

As previously mentioned, the upper portion of the front wall 5 is provided with a fan duct 6 having mounted thereupon a discharge nozzle 16 directed towards the interior of the greenhouse or enclosure 15. The wall of the duct 6 is provided with a circular fan opening 28 having concentrically disposed therethrough a suitable primary fan 29 comprising a plurality of fan blades 30. Power for driving the fan 29 is provided by a suitable fan motor 31 which is supported with its power shaft axially disposed within the fan opening 28 by means of a fan motor bracket 32 attached to the lower portion of the fan duct 6.

The discharge nozzle 16 includes a bottom wall 33 connected at its lowermost portion to the front wall 5 and fan duct 6 and extending outwardly therefrom in an upwardly curved direction into the enclosure 15. A pair of side walls 34 provide the remainder of the structure of the discharge nozzle 16 and form a discharge opening which is directed up towards the peak of the roof of the greenhouse. Disposed within the opening of the nozzle 16 are a plurality of parallel discharge louvres 35 each of which is adjustably supported at its opposite end to the adjacent portion of the nozzle structure 16. Thus it will be seen that the air directed outwardly from the primary unit A by means of the rotating fan blades 30 will be pushed in a smooth upwardly and curved direction out into the interior of the enclosure between the discharge nozzles 35. It will be apparent that the flow of air issuing from the nozzle 16 may be split into any of numerous flow paths or directions by means of adjustment of the nozzles 35 so as to properly distribute the air therefrom throughout the interior of the greenhouse or enclosure 15.

As will most clearly be seen in FIGURE 2 one side wall 7a of the furnace duct 7 is disposed in spaced-apart relationship with respect to the adjacent side wall 4 of the unit A housing so as to provide a controller air bypass chamber 36 extending the entire height of the lower compartment 12 and extending on the one hand from an opening disposed within the greenhouse 15, and on the other hand emptying into the lower heating compartment 12, the purpose of which will be described hereinafter.

As previously mentioned, motorized means are provided for regulating the position of the adjustable tie-rod 27 through the agency of any suitable gear means (not shown), whereupon it will be clearly apparent that when the tie-rod 27 is moved in either direction, the interconnected outside air damper blades 8a as well as the recirculating damper blade 11a will be moved more or less to an open or closed position, respectively. During the operation of the invention it will be understood that the fan motor 31 runs continuously so that at all times the fan blades 30 are directing a supply of air into the discharge nozzle and out between the adjustable directional louvres 35. It is by actuation of the heating furnace and dampers 8 and 11 that the condition of the air in the enclosure is controlled.

Conventional thermostatic means are disposed within the enclosure for regulating the operation of the heating assembly. This includes suitable limit control means for regulating the motorized tie-rod 27 in order to control the actuation of the dampers 8 and 11. This limit control means is of the high/low type whereby the tie-rod will be actuated in one direction when a preselected high temperature level is achieved within the enclosure and will be operated in the opposite direction when a preselected low temperature level is reached. The resultant actuation of the dampers 8 and 11 will be more clearly understood after considering the various air-flow patterns throughout the different sections of the primary unit A which patterns are dependent upon the particular adjustment of said dampers.

Referring to FIGURE 3 it will be seen that the tie-rod 27 has been moved in an upwardly and right-hand direction to its full limit whereby the outside air damper blades 8a have been fully closed. On the other hand, the recirculating damper blades 11a are fully open. With this arrangement the gas burners are turned on and the fan 29 draws 100% of the air being directed outwardly through the discharge nozzle 16 from the lower heating compartment 12 through the opened recirculating damper 11. Following the airflow indicated by the arrows in FIGURE 3, it will be observed that the air from within the enclosure is drawn by means of the fan 29 into the furnace duct 7 whereupon it is heated as it passes between the heat exchangers 17 before entering the lower heating compartment 12 and thereafter passing through or between the damper blades 11a and subsequently into the upper fan compartment 13 prior to being directed back into the enclosure 15 through the discharge nozzle 16. With the arrangement illustrated in FIGURE 3 maximum heating efficiency for the air is obtained as 100% of the air which has drawn into the lower heating compartment is heated and subsequently directed back into the enclosure. An important advantage of the upwardly inclined direction of the discharge end of the nozzle 16 is that the heated air is directed into the enclosure immediately beneath the pitched roof thereof. This prevents the direction of the air into the face of workers within the enclosure and more importantly precludes the impingement of this fan driven air upon the livestock or crops disposed within the enclosure.

As the temperature within the enclosure becomes elevated, the high-limit control means cuts off the gas burners and actuates the motorized tie-rod 27 to move the damper blades 8a and 11a from the full line position illustrated in FIGURE 3 towards the broken line position. As this movement takes place it will be observed that open passageways are provided between the upper fan compartment 13 and the outside atmosphere through the rear of the unit A, while concurrently, the opening formed by the passageway 26 separating the two compartments within the unit is progressively closed or restricted. It will follow that an amount of outside atmospheric air will be drawn in between the damper blades 8a and becomes admixed within the upper fan compartment 13 with the now lesser amount of air being drawn into this compartment from the lower heating compartment 12. This latter arrangement will continue until the cooler air which is now being discharged through the nozzle 16 into the enclosure, causes the low-limit switch of the control means to be actuated, whereby the tie-rod 27 will begin to return to its previous position, thereby closing the outside air damper blades 8a while at the same time opening the recirculating damper blades 11a a proportionate amount and again turning on the gas burners.

When the unit is operating with the outside air damper 8 open, it will follow that the static pressure within the greenhouse 15 as well as the lower heating compartment 12 will be increased according to the volume of fresh atmospheric air which is drawn into the greenhouse through the outside air damper 8. In order to regulate this static pressure within the enclosure, the damper blades 9a of the air exhaust damper which occupies the rear wall of the lower heating compartment 12 are provided with adjustable tensioning means (not shown) well known in the art, for maintaining these blades in the closed position as shown in full lines in FIGURE 3, against the static pressure of the air within the compartment 12. Regulation of the tension means controlling the damper blades 9a determines that point at which the air pressure within this compartment will cause these blades to open, thereby preventing the static pressure from exceeding the desired preselected level. It will thus be seen from the foregoing description that a continuous weather conditioning system is presented for maintaining a preselected air temperature and pressure within an enclosure by means of automatically controlled dampers for altering the air pattern as directed through the lower compartment 12 and upper compartment 13 of the unit A. The high-low limit thermostat means within the enclosure permits of a modulating pattern of the air flow through the unit A to achieve the referred to objects.

As shown in FIGURE 2, an air bypass chamber 36 formed between the side wall 7a of the furnace duct and the end wall 4 of the housing opens on the one hand with the interior of the enclosure and on the other hand with the lower heating compartment 12 and is not affected in any manner by the heat exchangers 17 which are disposed within the separately enclosed furnace duct 7. Since the fan 29 runs continuously, it will follow that a constant stream of air is drawn by the fan from within the enclosure through this air bypass chamber 36 into the heating compartment 12, the fan compartment 13, and back into the enclosure through the discharge nozzle 16. The purpose of the bypass chamber 36 is to cushion or buffer the effect upon the air within the enclosure when the high/low limit thermostat reaches either its high or low settings, at which time the gas burners 18 are turned off or on, respectively. As will be observed, the cross-sectional area of the bypass chamber 36 is only a small fraction of the total cross-sectional area of the furnace duct 7. However, the constant passage of a small amount of untreated air through this chamber is sufficient to prohibit any erratic change in temperature within the enclosure when the thermostat reaches either its high or low limits.

In many areas wherein the unit may be used, the mean humidity level may be too low for the efficient propagation of plants or livestock within the enclosure. In this connection it will be noted with respect to FIGURE 3 that suitable humidifying means 39 may be mounted on the rear wall of the housing A in overlying relationship to the outside air damper 8 so that all air from the outside atmosphere which is drawn into the enclosure 15 will be drawn through the humidifier and thereby properly treated to obtain the desired humidity before being directed into the enclosure.

The entire description up to this point has been directed to the primary unit or housing A which in many instances will be entirely sufficient for properly regulating the weather within an enclosure 15. However, depending upon the size of the various components within the unit A relative to the total volume of air within the enclosure intended to be treated, it may be necessary to provide for the additional circulation of air within the enclosure in order to obtain the proper admixture of outside atmospheric air. If this is the case, then additional secondary or alternate units B may be provided in conjunction with a single primary unit A. The construction of the secondary units B is practically identical to the arrangement of the primary units with the exception that the heat exchanging means is omitted therefrom.

FIGURES 4 and 5, taken through an alternate unit B, illustrate two different arrangements of the damper blades therein. It will be understood that the regulation of the outside air dampers 8 and the recirculating dampers 11 in both the units A and B are concurrent, that is, the motorized means for regulating both tie-rods 27 in the two units are instantly controlled by the same high/low limit thermostat means within the enclosure so that the same setting of the damper blades 8a and 11a will be achieved in the two units. In this manner twice the volume of air is being continually circulated through the two units and it is possible to introduce twice as much air from the outside atmosphere by means of the two outside air dampers 8.

FIGURE 4 illustrates a setting wherein the recirculating damper 11 is fully closed while the outside air damper 8 is fully opened. The resultant air pattern through the discharge nozzle 16 comprises 100% outside atmospheric air being directed into the enclosure. Accordingly it will be observed that the static pressure within the enclosure would be increased materially in view of this introduction of such a large volume of outside atmospheric air. As shown in FIGURE 4, the damper blades 9a are being forced open by this increase in static air pressure to permit the surplus air above that of the preselected setting of the air exhaust damper blades 9a, to be discharged outwardly and to the atmosphere.

In the example illustrated in FIGURE 5 both the outside air damper 8 and recirculating damper 11 are partially closed so that some air entering into the lower compartment 12 from the enclosure will be drawn into the upper fan compartment 13 and admixed with a smaller amount of fresh air from the atmosphere being admitted through the damper 8. Since in this example atmospheric air is still being admitted into the enclosure, it will follow that the preselected damper 9 will still be forced open to at least a small degree as it is possible that the static pressure desired within the enclosure is being exceeded by said admission of outside atmospheric air.

Suitable screening material 37 overlies the outer exposed area of the furnace duct 7 to prevent not only light weight articles such as leaves or pieces of paper from being drawn into the heating chamber and lower heating compartment but also to prevent occupants of the greenhouse from coming in accidental contact with the heat exchangers 17. This screen 37 will be understood to extend to one side to also overlie the opening of the air bypass chamber 36. In the secondary units B, there is no furnace duct within the front wall but instead, the entire lower half of the front of the unit is open to permit air to be drawn into the lower compartment 12 by the fan 29 of this unit. The face of this opening is likewise provided with a protective screen 38.

From the above description, it will be apparent that there is thus provided a device of the character described possessing the particular features of advantage, before enumerated as desirable, but which obviously is susceptible of modification in its form, proportions, detailed construction and arrangement of parts without departing from the principle involved or sacrificing any of its advantages.

It is to be understood that the invention is not limited to the specific features shown, but that the means and construction herein disclosed comprise the preferred form of several modes of putting the invention in effect and the invention is therefore defined in any of its forms or modifications within the scope of the appended claims.

We claim:

1. In a system for condititoning air, the combination comprising, an enclosure formed by a roof and a plurality of walls, a housing having a front wall disposed within an opening in one wall of said enclosure, means dividing the interior of said housing into upper and lower compartments, a furnace duct opening on one hand through said front wall into said enclosure and directed on the other hand into said lower compartment, heating means within said duct, a discharge nozzle through said front wall for directing air from said upper compartment into said enclosure, fan means propelling air from said upper chamber through said nozzle and into said enclosure, said dividing means including adjustable first damper means forming the sole passage between said two compartments for selectively regulating the volume of air recirculated by said fan means from the enclosure through the duct and lower compartment into the upper compartment and through the discharge nozzle, second adjustable damper means disposed within an opening through the rear wall of said housing for selectively regulating the admission of outside air into said upper compartment, by said fan means, adjusting means interconnecting said first and second damper means whereby movement of said adjusting means in one direction closes one of said damper means while opening the other of said damper means, wherein, by actuation of said adjusting means said two damper means may be positioned to regulate the proportional volume of outside air admitted into said upper compartment for admixture with the air being recirculated therethrough from said lower compartment prior to discharge by said fan means into said enclosure through said discharge nozzle, and an adjustable air exhaust damper in one wall of said lower compartment communicating with the outside air for maintaining the air pressure in said enclosure at a preselected level.

2. A system for conditioning air according to claim 1 wherein, the end of said discharge nozzle is directed upwardly towards the roof of said enclosure and is provided with a plurality of pivotally mounted directional louvres.

3. A system for conditioning air according to claim 1, including, an air bypass chamber communicating through said front wall of said housing and delivering air into said lower chamber without passage through said furnace duct.

4. A system for conditioning air according to claim 1, including, humidifying means overlying said second damper means for treating outside air admitted therethrough into said upper compartment.

References Cited by the Examiner
UNITED STATES PATENTS

| | | | |
|---|---|---|---|
| 1,576,086 | 3/1926 | Browne | 126—90 |
| 1,921,900 | 8/1933 | Wood | 98—33 |
| 2,259,780 | 10/1941 | Seid | 98—33 X |
| 2,327,663 | 8/1943 | Otis | 236—38 X |
| 2,530,486 | 11/1950 | Steinmetz | 126—110 |
| 2,540,280 | 2/1951 | Norman | 126—110 |
| 2,983,213 | 5/1961 | Bohanon | 98—33 |

JAMES W. WESTHAVER, *Primary Examiner.*